United States Patent
Choi et al.

(10) Patent No.: US 9,877,144 B2
(45) Date of Patent: Jan. 23, 2018

(54) METHOD FOR TRANSMISSION OF IPV6 PACKETS OVER NEAR FIELD COMMUNICATION (NFC) AND DEVICE OPERATING THE SAME

(71) Applicant: Electronics and Telecommunications Research Institute, Daejeon (KR)

(72) Inventors: Young Hwan Choi, Daejeon (KR); Yong Geun Hong, Daejeon (KR); Myung Ki Shin, Seoul (KR); Hyoung Jun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 154 days.

(21) Appl. No.: 14/790,244

(22) Filed: Jul. 2, 2015

(65) Prior Publication Data

US 2016/0007398 A1    Jan. 7, 2016

(30) Foreign Application Priority Data

Jul. 4, 2014 (KR) .................. 10-2014-0083530
Oct. 6, 2014 (KR) .................. 10-2014-0134372
Jun. 23, 2015 (KR) .................. 10-2015-0089031

(51) Int. Cl.
*H04W 4/00* (2009.01)
*H04L 29/12* (2006.01)
*H04W 28/06* (2009.01)

(52) U.S. Cl.
CPC ............ *H04W 4/008* (2013.01); *H04L 61/103* (2013.01); *H04L 61/6004* (2013.01); *H04L 61/6059* (2013.01); *H04W 28/065* (2013.01)

(58) Field of Classification Search
None
See application file for complete search history.

(56) References Cited

U.S. PATENT DOCUMENTS

| | | | | |
|---|---|---|---|---|
| 7,920,481 B2 * | 4/2011 | Winter | ............... | H04L 45/00 370/248 |
| 7,978,681 B2 * | 7/2011 | Chung | ............... | H04L 47/10 370/229 |
| 8,107,498 B2 * | 1/2012 | Morimoto | ........... | H04L 45/24 370/501 |

(Continued)

FOREIGN PATENT DOCUMENTS

KR    10-2014-0030421    3/2014

OTHER PUBLICATIONS

U.S. Appl. No. 61/866,890, filed Aug. 16, 2013, "Test System for Performing Benchmark Reference Testing", corresponds to PGPUB 20150051872 above, Arora et al., p. 1-2.*

*Primary Examiner* — Gregory Sefcheck
(74) *Attorney, Agent, or Firm* — Kile Park Reed & Houtteman PLLC

(57) ABSTRACT

Provided are a method of transmitting an Internet Packet version 6 (IPv6) packet over near field communication (NFC) and a device for performing the method. The method of transmitting an IPv6 packet over NFC includes receiving the IPv6 packet through a Logical Link Control Protocol (LLCP), and transmitting the IPv6 packet to an Information Field in Protocol Data Unit (I PDU) of the LLCP, and transmitting the IPv6 packet through an adaptation layer for IPv6 over NFC, wherein the maximum number of octets in the I PDU is determined based on a Maximum Transfer Unit (MTU).

17 Claims, 13 Drawing Sheets

(56) References Cited

U.S. PATENT DOCUMENTS

| | | | | |
|---|---|---|---|---|
| 8,175,102 B2* | 5/2012 | Kim | H04L 29/1232 | |
| | | | 370/395.53 | |
| 8,228,954 B2* | 7/2012 | Thubert | H04W 40/246 | |
| | | | 370/328 | |
| 8,385,823 B2* | 2/2013 | Naniyat | H04W 76/02 | |
| | | | 370/469 | |
| 8,576,847 B2* | 11/2013 | Hegde | H04L 43/10 | |
| | | | 370/392 | |
| 8,797,944 B2* | 8/2014 | Choi | H04W 8/02 | |
| | | | 370/328 | |
| 8,923,182 B2* | 12/2014 | Shelby | H04W 4/005 | |
| | | | 370/312 | |
| 8,996,666 B2* | 3/2015 | Vasseur | H04L 47/10 | |
| | | | 709/220 | |
| 9,107,033 B2* | 8/2015 | An | H04W 8/02 | |
| 9,325,382 B2* | 4/2016 | Arunan | H04L 61/20 | |
| 9,472,093 B2* | 10/2016 | Popa | G01D 4/006 | |
| 9,515,862 B2* | 12/2016 | Hwang | H04L 27/2627 | |
| 2010/0329161 A1* | 12/2010 | Ylanen | H04W 88/06 | |
| | | | 370/310 | |
| 2015/0051872 A1* | 2/2015 | Arora | G06F 11/3428 | |
| | | | 702/186 | |
| 2015/0131469 A1* | 5/2015 | Kim | H04L 47/365 | |
| | | | 370/252 | |
| 2015/0147973 A1* | 5/2015 | Williams | H04W 76/02 | |
| | | | 455/41.2 | |
| 2015/0188949 A1* | 7/2015 | Mahaffey | H04L 63/20 | |
| | | | 726/1 | |
| 2016/0007398 A1* | 1/2016 | Choi | H04W 4/008 | |
| | | | 370/310 | |

* cited by examiner

FIG. 4

```
 0                 0         1     2             3
 0                 8         6     2             1
+---------+---------+--------+-------------+
|  Type   | Length  |      Value           |
+---------+---------+--------+-------------+
|00000010 |00000010 | 1011   |    MIUX     |
+---------+---------+--------+-------------+
                             | <-------->  |
                              0x000 ~ 0x7FF
```

FIG. 8

```
 0                   1
 0 1 2 3 4 5 6 7 8 9 0 1 2 3 4 5
+-+-+-+-+-+-+-+-+-+-+-+-+-+-+-+-+
| Padding(all zeros)| NFC Addr. |
+-+-+-+-+-+-+-+-+-+-+-+-+-+-+-+-+
```

FIG. 10

```
 0                   1
 0 1 2 3 4 5 6 7 8 9 0 1 2 3 4 5
+-+-+-+-+-+-+-+-+-+-+-+-+-+-+-+-+
| Padding(all zeros)|1 1 1 1 1 1|
+-+-+-+-+-+-+-+-+-+-+-+-+-+-+-+-+
```

METHOD FOR TRANSMISSION OF IPV6 PACKETS OVER NEAR FIELD COMMUNICATION (NFC) AND DEVICE OPERATING THE SAME

CROSS-REFERENCE TO RELATED APPLICATIONS

This application claims the priority benefit of Korean Patent Application No. 10-2014-0083530, filed on Jul. 4, 2014, Korean Patent Application No. 10-2014-0134372, filed on Oct. 6, 2014, and Korean Patent Application No. 10-2015-0089031, filed on Jun. 23, 2015, in the Korean Intellectual Property Office, the disclosures of which are incorporated herein by reference.

BACKGROUND

1. Field of the Invention

Embodiments relate to the Internet of Things (IoT) using Internet-based low power wireless technology, and more particularly, a method of applying an Institute of Electrical and Electronics Engineers (IEEE) 802.15.4 based Internet Protocol version 6 (IPv6) packet transmission method to heterogeneous wireless technology.

2. Description of the Related Art

There are communication standards for transmission of Internet Protocol version 6 (IPv6) packets for Internet communication based on an existing Institute of Electrical and Electronics Engineers (IEEE) 802.15.4 low power sensor network. However, for communication between heterogeneous things based on various wireless technologies in the future, the existing communication standards may not be readily applied as standards and algorithms for transmitting IPv6 packets based on other wireless technologies, for example, Bluetooth and infrared (IR) communication.

SUMMARY

Embodiments provide a method, for example, an Internet Protocol version 6 (IPv6) address configuration method, a header compression method, a neighbor node discovery method, and a fragmentation method, required to transmit IPv6 packets over near field communication (NFC).

According to an embodiment, there is provided a method of transmitting an IPv6 packet over NFC, the method including receiving the IPv6 packet through a Logical Link Control Protocol (LLCP), and transmitting the IPv6 packet to an Information Field in Protocol Data Unit (I PDU) of the LLCP; and transmitting the IPv6 packet through an adaptation layer for IPv6 over NFC, wherein the maximum number of octets in the I PDU is determined based on a Maximum Transfer Unit (MTU).

The method of transmitting an IPv6 packet over NFC may further include generating an interface identifier (IID) included in an IPv6 link local address of an NFC-enabled communication device based on an address of the LLCP.

The address of the LLCP may include at least one of an address of a Destination Service Access Point (DSAP) and an address of a Source Service Access Point (SSAP).

The method of transmitting an IPv6 packet over NFC may further include determining the MTU based on a Maximum Information Unit extension (MIUX) parameter.

The determining includes verifying a presence of the adaptation layer and determining the MIUX parameter based on a result of verifying.

In response to a presence of the adaptation layer and a presence of the IPv6 packet to be transmitted, the determining may include discovering an MTU value from a neighbor communication device of a communication device to transmit the IPv6 packet; and determining the MTU based on the discovered MTU value.

The determining of the MTU based on the discovered MTU value may include determining the MTU by comparing the discovered MTU value and a first setting value.

In response to the discovered MTU value differing from the first setting value, the determining of the MTU based on the discovered MTU value may further include determining the MTU by comparing the discovered MTU value and a second setting value.

The first setting value may be 1280 bytes.

The second setting value may be 2176 bytes.

The neighbor communication device may be a neighbor terminal of Internet Control Message Protocol version 6 (ICMPv6).

According to another embodiment, there is provided an NFC-enabled communication device, the communication device including an LLCP configured to receive an IPv6 packet, and to transmit the IPv6 packet to an I PDU; and an adaptation layer for IPv6 over NFC configured to transmit and receive the IPv6 packet, wherein the maximum number of octets in the I PDU is determined based on an MTU.

The communication device may be configured to generate an IID included in an IPv6 link local address of the NFC-enabled communication device based on an address of the LLCP.

The address of the LLCP may include at least one of an address of a DSAP and an address of an SSAP.

The communication device may be further configured to determine the MTU based on a MIUX parameter.

The communication device may be further configured to verify a presence of the adaptation layer and to determine the MIUX parameter based on a result of verifying.

In response to a presence of the adaptation layer and a presence of the IPv6 packet to be transmitted, the communication device may be further configured to discover an MTU value from a neighbor communication device of the communication device to transmit the IPv6 packet, and to determine the MTU based on the discovered MTU value.

The communication device may be further configured to determine the MTU by comparing the discovered MTU value and a first setting value.

In response to the discovered MTU value differing from the first setting value, the communication device may be further configured to determine the MTU by comparing the discovered MTU value and a second setting value.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIG. 4 illustrates a format of a Maximum Information Unit extension (MIUX) parameter Type-Length-Value (TLV) according to an embodiment;

FIG. 8 illustrates a format of an NFC short address according to an embodiment;

FIG. 10 illustrates a format of a link layer address option for multicast address mapping according to an embodiment;

DETAILED DESCRIPTION

Figure 1:
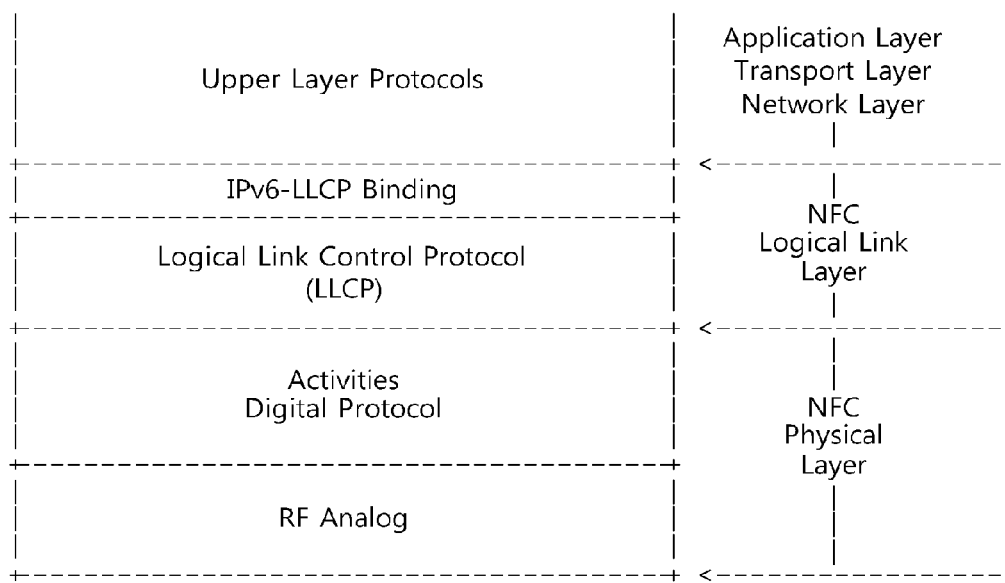
FIG. 1 illustrates a near field communication (NFC) protocol stack with Internet Protocol version 6 (IPv6) bindings to a Logical Link Control Protocol (LLCP) according to an embodiment.

Reference will now be made in detail to embodiments, examples of which are illustrated in the accompanying drawings, wherein like reference numerals refer to like elements throughout. Embodiments are described below to explain the present disclosure by referring to the figures.

It should be understood, however, that there is no intent to limit this disclosure to the particular embodiments disclosed. On the contrary, embodiments are to cover all modifications, equivalents, and alternatives falling within the scope of the example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of this disclosure. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion, for example, "between," versus "directly between," "adjacent," versus "directly adjacent," etc.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various Internet networking protocols for low-power Internet of Things (IoT) devices are to be supported in order to provide an IoT application and service based on transmission control protocol/Internet protocol (TCP/IP) Internet. Although systems and methods for IP address resources for many IoT devices are required, IPv4 addresses cannot be assigned any more. An IPv6 address may replace the IPv4 address. Existing 6 Low-Power Wireless Personal Area Networks (6LoWPAN) based thereon, i.e., standards associated with Institute of Electrical and Electronics Engineers (IEEE) 802.15.4 based IPv6 transmission are currently established. However, such standards cannot support various low-power wireless technologies. That is, a new IPv6 transmission method is required for each wireless technology. Herein, among various wireless technologies, a method, for example, an IPv6 address configuration method, a header compression method, a neighbor node discovery method, and a fragmentation method, required to transmit IPv6 packets over NFC corresponding to a wireless technology installed in many mobiles phones will be defined.

Hereinafter, embodiments will be described with reference to the accompanying drawings.

FIG. 1 illustrates an NFC protocol stack with IPv6 bindings to a Logical Link Control Protocol (LLCP) according to an embodiment.

Referring to FIG. 1, an IP may use services provided by an LLCP in an NFC protocol stack in order to provide two-way transmission between peer devices. For data communication in IPv6 over NFC, an IPv6 packet may be received at the LLCP of NFC and may be transmitted to an Information Field in Protocol Data Unit (I PDU) of an LLCP of an NFC-enabled device or an NFC-enabled peer device.

Since the LLCP does not support a fragmentation and reassembly (FAR), upper layers are to support the FAR. For IPv6 addressing and address configuration, the LLCP is to provide related information, for example, a link layer address, to an upper layer of the LLCP. An LLCP to IPv6 protocol binding is to transfer a Source Service Access Point (SSAP) value and a Destination Service Access Point (DSAP) value to the IPv6 over an NFC protocol. For example, an SSAP may be a 6-bit value indicating a Logical Link Control (LLC) address and a DSAP may indicate an LLC address of a destination NFC-enabled device.

The LLCP may be configured through LLC and Media Access Control or Medium Access Control (MAC) mapping. The MAC mapping integrates an existing radio frequency (RF) protocol into the LLCP architecture. The LLC includes three components, for example, a Link Management, a Connection-oriented Transport, and a Connectionless Transport.

The Link Management component may be responsible for serializing all connection-oriented and connectionless LLC Protocol Data Unit (PDU) exchanges and for aggregation and disaggregation of small PDUs. Also, the Link Management component may guarantees asynchronous balanced mode communication and may provide a link status supervision by performing a symmetry procedure.

The Connection-oriented Transport component may be responsible for maintaining all connection-oriented data exchanges including a connection set-up and termination. The Connectionless Transport component may be responsible for handling, for example, processing unacknowledged data exchanges.

Figure 2:
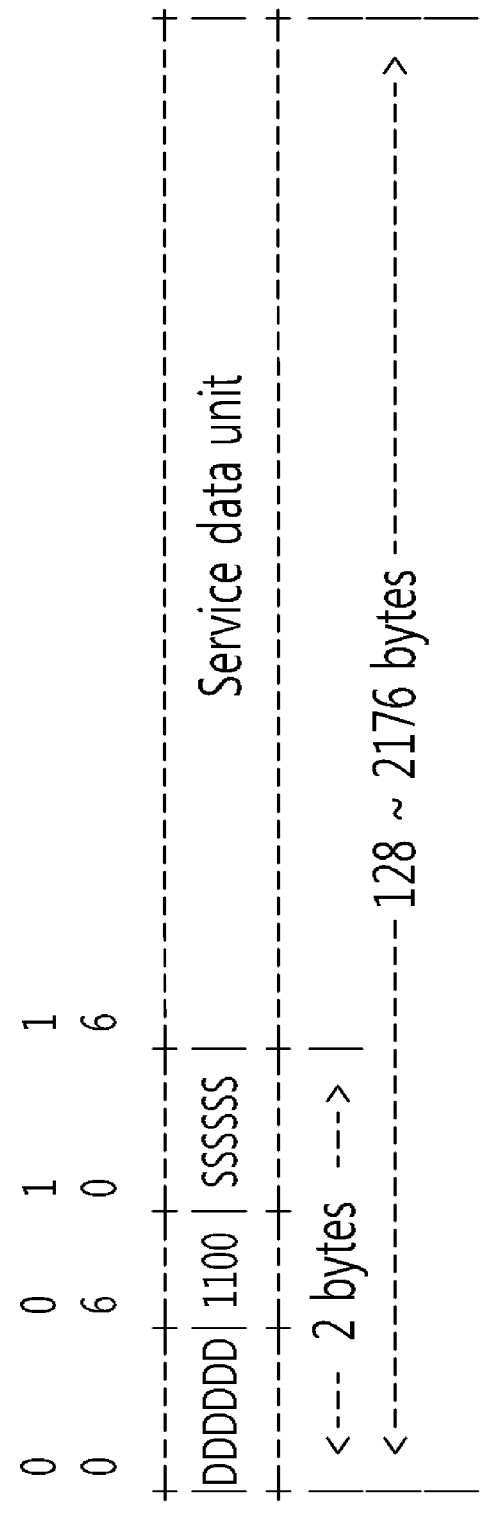
FIG. 2 illustrates a format of an Unnumbered Information Protocol Data Unit (UI PDU) in NFC according to an embodiment.
Figure 3:
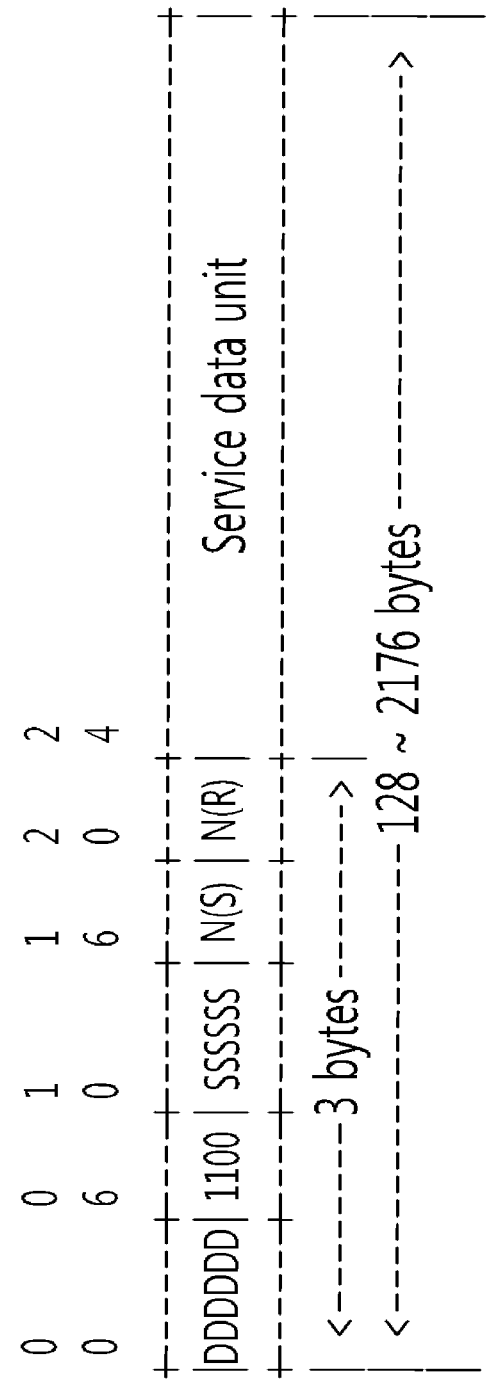
FIG. 3 illustrates a format of an Information Field in Protocol Data Unit (I PDU) in NFC according to an embodiment.

FIG. 2 illustrates a format of an Unnumbered Information Protocol Data Unit (UI PDU) in NFC according to an embodiment, FIG. 3 illustrates a format of an I PDU in NFC according to an embodiment, and FIG. 4 illustrates a format of a Maximum Information Unit extension (MIUX) parameter Type-Length-Value (TLV) according to an embodiment.

Referring to FIGS. 1 through 4, communication devices, for example, NFC-enabled devices may be identified based on a 6-bit LLC address. For example, any address may be used as an SSAP address and a DSAP address. Address values between 9 and 31 (ooh to 1Fh) may be reserved for well-known service access points for a Service Discovery Protocol (SDP). Address values between 32 and 63 (20h to 3Fh) may be inclusively assigned by an LLC, for example, a local LLC as a result of an upper layer service request.

As described above with reference to FIG. 1, an IPv6 packet may be received at an LLCP of NFC and may be transmitted to an UI PDU and an I PDU of an LLCP of an NFC-enabled device or an NFC-enabled peer device.

Referring to FIG. 3, an I PDU sequence field may include two sequence numbers, for example, a send sequence number N(S) and a receive sequence number N(R). The send sequence number N(S) may indicate a sequence number associated with an I PDU. A value of the receive sequence number N(R) may indicate that I PDUs numbered up through N(R)−1 have been accurately received by a sender of a corresponding I PDU and successfully transferred to senders SAP identified in an SSAP field.

An information field of the I PDU may include a single service data unit. The maximum number of octets in the information field may be determined based on a Maximum Information Unit (MIU) for a data link connection. The MIU may be a Maximum Transfer Unit (MTU). For example, a default value of the MIU for I PDUs may be 128 octets. Local and remote LLCs may establish and maintain distinct MIU values, respectively, for each data link end point. Also, an LLC may announce a relatively large MIU value for a data link connection by transmitting an MIU extension (MIUX) parameter within the information field. If no MIUX parameter is transmitted, a default MIU value of 128 may be used. Otherwise, an MTU size in NFC LLCP may be used to calculate an MIU value as expressed by Equation 1.

$$MIU=128+MIUX \quad \text{[Equation 1]}$$

When the MIUX parameter is encoded as a TLV format, the TLV format of the MIUX parameter may be represented as illustrated in FIG. 4. A TLV type field may be 0x02 and a TLV length field may be 0x02. The MIUX parameter may be encoded to least significant 11 bits of a TLV value field. Unused bits in the TLV value field may be set to zeros by a sender, and may be ignored by a receiver. A maximum value of the TLV value field may be 0x7FF, and a maximum size of the MTU in NFC LLCP may be calculated as 2176 bytes.

Figure 5:
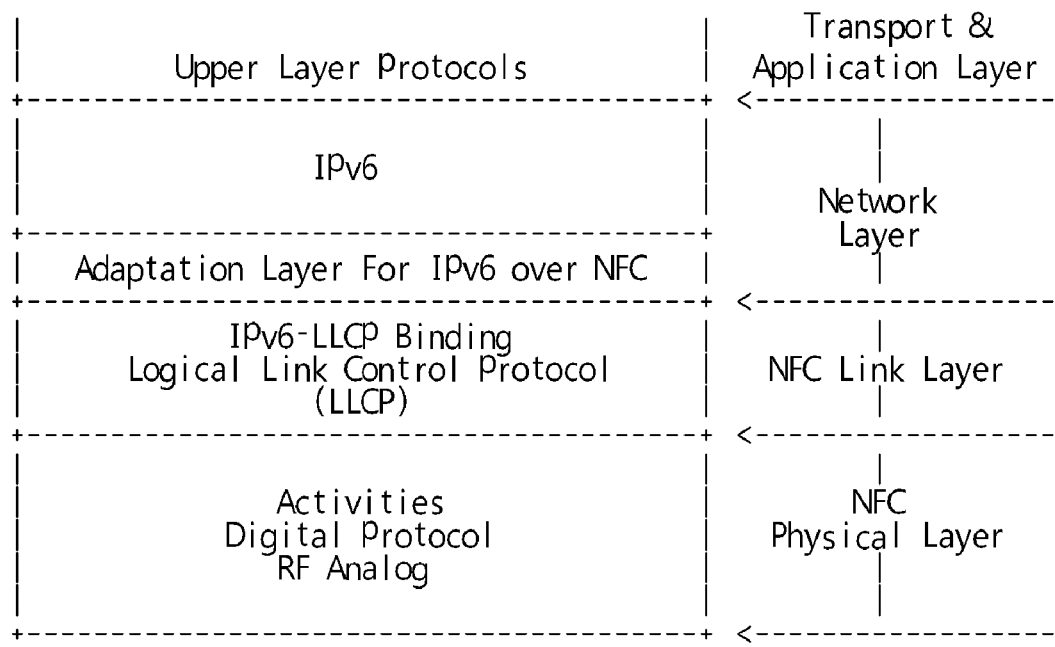
FIG. 5 illustrates a protocol stack structure for transmission of IPv6 packets over NFC according to an embodiment.

FIG. 5 illustrates a protocol stack structure for transmission of IPv6 packets over NFC according to an embodiment.

Hereinafter, a protocol stack for transmission of IPv6 packets over NFC will be described with reference to FIG. 5.

Initially, a protocol stack will be described as follows:

Upper layer protocols may include transport protocols, for example, a TCP and a user datagram protocol (UDP), an adaptation layer, and other protocols capable of running, for example, executable on top of IPv6. A data link and a physical layer for transmitting NFC packets may be present below IPv6. The adaptation layer may be required between an IPv6 protocol and a data link layer to transmit IPv6 packets over NFC.

The adaptation layer for IPv6 over NFC may be a protocol layer required to transmit and receive IPv6 datagrams, for example, packets generated by the IPv6 protocol. The adaptation layer may provide a method about a neighbor discovery, an address auto-configuration, a header compression, and a fragmentation and reassembly.

A link model will be described as follows:

In a case of Bluetooth low energy (BT-LE), a Logical Link Control and Adaptation Protocol (L2CAP) supports a fragmentation and reassembly (FAR) functionality. Accordingly, an adaptation layer for IPv6 over BT-LE does not need to perform a FAR procedure.

However, an NFC link layer is similar to IEEE 802.15.4. The adaptation layer for IPv6 over NFC is to support the FAR functionality. Accordingly, a fragmentation functionality as defined in Request For Comments (RFC)4944 is to be used in an NFC-enabled device network.

An NFC link between communication devices may be considered to be a point-to-point link. Dissimilar to BT-LE, the NFC link may not consider a star topology and a mesh network and instead, may consider a peer-to-peer topology and a simple multi-hop topology. Due to the characteristics, 6LoWPAN functionalities such as an addressing and auto-configuration and a header compression may be specialized in NFC.

Figure 6:
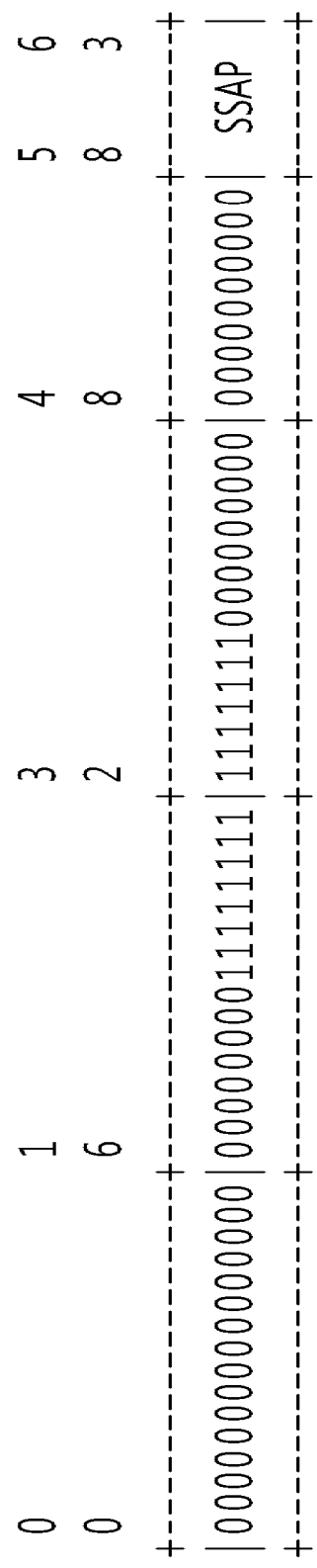
FIG. 6 illustrates a formation of an interface identifier (IID) from an NFC-enabled communication device address according to an embodiment.
Figure 7:
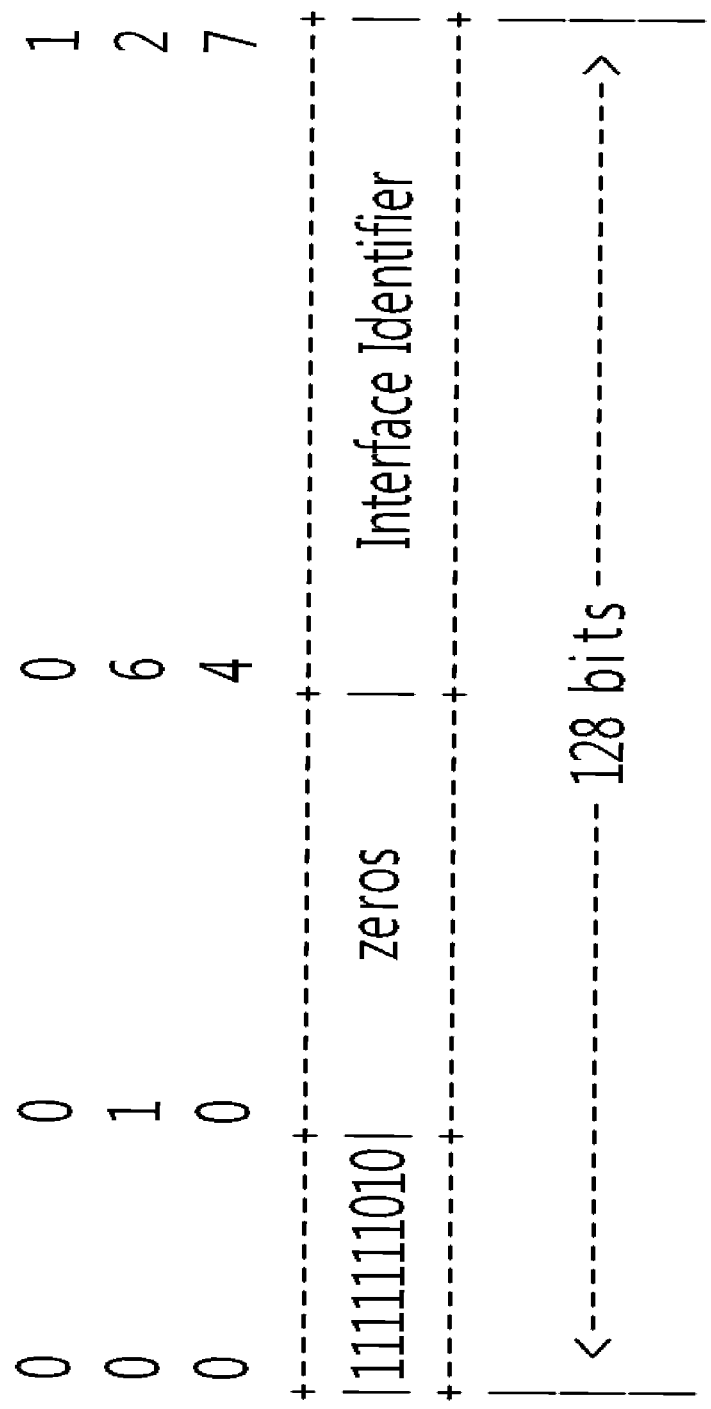
FIG. 7 illustrates a formation of an IPv6 link local address in NFC according to an embodiment.

FIG. 6 illustrates a formation of an interface identifier (IID) from an NFC-enabled device address according to an embodiment, and FIG. 7 illustrates a formation of an IPv6 link local address in NFC according to an embodiment.

Hereinafter, an address forming process in which devices for transmitting IPv6 packets over NFC form addresses to be used in a link local layer will be described with reference to FIGS. 6 and 7.

Initially, a stateless address auto-configuration will be described as follows:

An NFC-enabled device, for example, 6LN may perform stateless address auto-configuration. A 64-bit IID for an NFC interface may be generated, for example, formed by utilizing a 6-bit link address, that is, a 6-bit NFC LLCP address, for example, an address of a DSAP or an SSAP. The 6-bit link address may be generated in a lower NFC link layer. From viewpoint of an address configuration, since each data link connection is uniquely identified by a pair of a DSAP and an SSAP included in a header of each LLC PDU in NFC, an IID may guarantee a stable IPv6 address.

Following the guidance of RFC7136, IIDs of all unicast addresses for NFC-enabled devices may be generated based on a 64-bit length and may be constructed in a modified Extended Unique Identifier (EUI)-64 format as illustrated in FIG. 6.

In addition, a "Universal/Local" bit in the case of an NFC-enabled device address may be set to 0 or RFC4291.

When NFC-based IoT devices are to generate an address, the IoT devices generates a 64-bit IID by including a Universal/Local flag setting bit. However, an NFC link address includes only 6 bits and thus, may not readily have a uniqueness in a global area, for example, may not preserve a global uniqueness. Accordingly, the uniqueness may be guaranteed only in a local area by setting a "Universal/Local" bit to 0.

An IPv6 link local address will be described as follows:

Only when an NFC-enabled device address is known to be a public address, a "Universal/Local" bit may be set to 1.

Referring to FIG. 7, an IPv6 link local address for an NFC-enabled device may be generated by appending an IID to a prefix FE80::/64. The 64-bit IID may be generated based on an SSAP address used in an NFC data link layer.

An IPv6 prefix obtained by the NFC-enabled device may be generated from an NFC router connected to the adjacent Internet through Dynamic Host Configuration Protocol version 6 (DHCPv6) technology defined in RFC3633 and be transferred.

Hereinafter, a neighbor discovery will be described:

A neighbor discovery optimization for 6LoWPAN (RFC6775) describes a neighbor discovery approach in several 6LoWPAN topologies such as a mesh topology.

Due to communication characteristics of NFC, a communication distance between two devices is to be maintained to be within 10 cm. Thus, it is not easy to configure various topology networks. An NFC link may not consider a complicated mesh topology and instead may consider a simple multi-hop topology or a directly connected peer-to-peer topology. Accordingly, the following aspects of RFC6775 may be applicable to NFC.

(1) In a case in which an NFC-enabled device, for example, 6LN is directly connected to the Internet and performs communication, a node, for example, 6LBR to serve as a gateway with the Internet is required and a communication distance between two nodes is to be maintained to be within 10 cm. In general, since communication over NFC is to transmit and receive small data rather than to transmit and receive big data, data transmission and reception is enabled with a one-time touch. When a tool, such as DHCPv6, is used to generate a global address from 6LBR prior to performing data communication, a Duplicated Address Detection (DAD) is not required.

When the NFC-enabled device, for example, 6LN is directly connected to 6LBR, for example, the node serving as the gateway with the Internet, the NFC-enabled device, for example, 6LN may register an address of the NFC-enabled device to 6LBR by transmitting a Neighbor Solicitation (NS) message with an Address Registration Option (ARO), and may process a Neighbor Advertisement (NA) accordingly. In addition, DHCPv6 is used to assign an address and thus, a DAD may not be required.

(2) In a case of transiently transmitting and receiving data between NFC devices, such as ad-hoc communication, a DAD is required during a link local address forming process and information such as a neighbor node list is to be maintained.

For sending Router Solicitations and processing Router Advertisements, the NFC-enabled device, for example, 6NL is to follow Sections 5.3 and 5.4 of RFC6775.

Hereinafter, a header compression will be described with reference to FIG. 8 as follows:

FIG. 8 illustrates an NFC short address format according to an embodiment. Various header compression methods are defined in the existing IEEE 802.15.4-based IPv6 packet transmission standards, for example, RFC4944 and RFC6282. In an NFC-enabled device network, a header compression may be performed by using only a portion of the specified methods according to a simple network formation and communication method. A header compression as defined in RFC6282 that specifies a compression format for IPv6 datagrams on top of IEEE 802.15.4 may be required as a basis for IPv6 header compression on top of NFC. All headers may be compressed according to RFC6282 encoding formats. If a 16-bit address is required as a short address of IEEE 802.15.4, the 16-bit address may be generated by padding a 6-bit NFC link layer (node) address to the left with zeros as illustrated in FIG. 8.

Subsequently, a fragmentation and reassembly (FAR) will be described:

As described above with reference to FIGS. 1 through 4, NFC provides a fragmentation and reassembly (FAR) for payloads from 128 bytes up to 2176 bytes. A general IPv6 MTU may fit into a single NFC link frame.

A FAR functionality defined in RFC4944 that specifies a fragmentation method for IPv6 datagrams on top of IEEE 802.15.4 may not be required as a basis for an IPv6 datagram FAR on top of NFC.

An NFC link connection for IPv6 over NFC is to be configured with an equivalent MTU size to fit an MTU size of an IPv6 packet. However, a default configuration of a MIUX value is 0x480 in order to fit an MTU, for example, 1280 bytes of the IPv6 packet.

All headers are to be compressed according to RFC64944 encoding formats, and a default MTU of NFC is 128 bytes.

Figure 9:
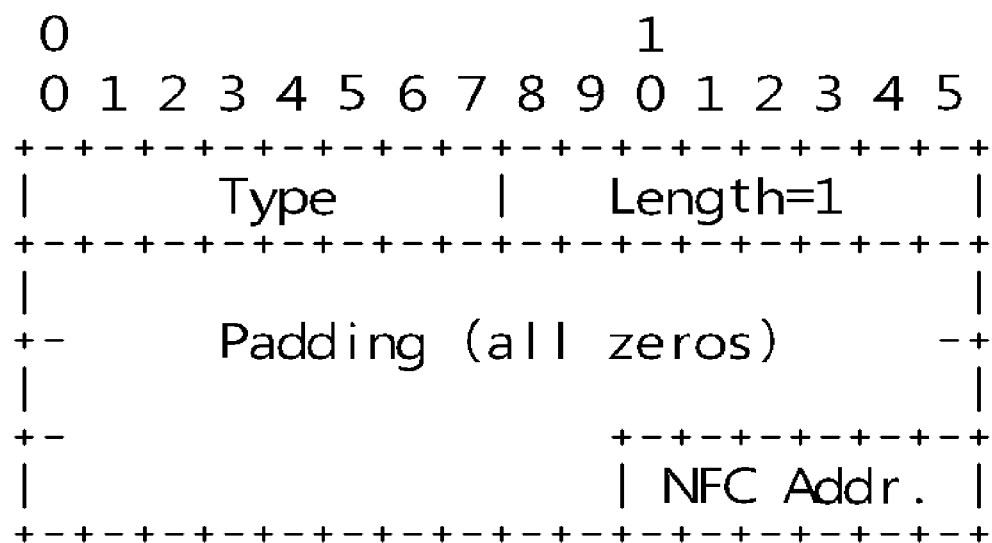
FIG. 9 illustrates a format of a link layer address option for unicast address mapping according to an embodiment.

Hereinafter, unicast address mapping will be described with reference to FIG. 9 as follows:

FIG. 9 illustrates a format of a link layer address option for unicast address mapping according to an embodiment.

Referring to FIG. 9, an address resolution procedure for mapping an IPv6 unicast address to an NFC link layer address may follow an address resolution procedure defined in RFC4861.

When an address is a 6-bit NFC link layer (node) address, a source/target link layer address option may have the following form. Here, for a Neighbor Solicitation, a Router Solicitation, and a Router Advertisement, a target link layer address option is required. FIG. 9 illustrates such an option format.

Option fields may be expressed as follows:
Type:
1: for source link layer address
2: for target link layer address
Length:
The length may indicate a length of an option (including type and length fields) in units of 8 octets. A value of this field may be 1 for a 6-bit NFC node address.
NFC Address:
The NFC address, for example, an NFC link layer (node) address, may be a 6-bit address in canonical bit order. The NFC address may be a unicast address to which an interface currently responds. All the remaining bits may be filled with zeros, excluding the 6-bit NFC link address.

Hereinafter, multicast address mapping will be described with reference to FIG. 10 as follows:

FIG. 10 illustrates a format of a link layer address option for multicast address mapping according to an embodiment.

Referring to FIG. 10, all IPv6 multicast packets may be transmitted, for example, broadcasted to an NFC destination address, for example, 0x3F, and may be filtered in an IPv6 layer. When represented as a 16-bit address in a compressed header, for example, an IPv6 multicast packet is to be generated by padding on the left with a zero. In addition, the NFC destination address, for example, 0x3F may not be used as a unicast NFC address of an SSAP or a DSAP.

Hereinafter, a network configuration, for example, Internet connectivity scenarios will be described.

As two configuration scenarios, an NFC network may be isolated from and connected to the Internet.

Figure 11:
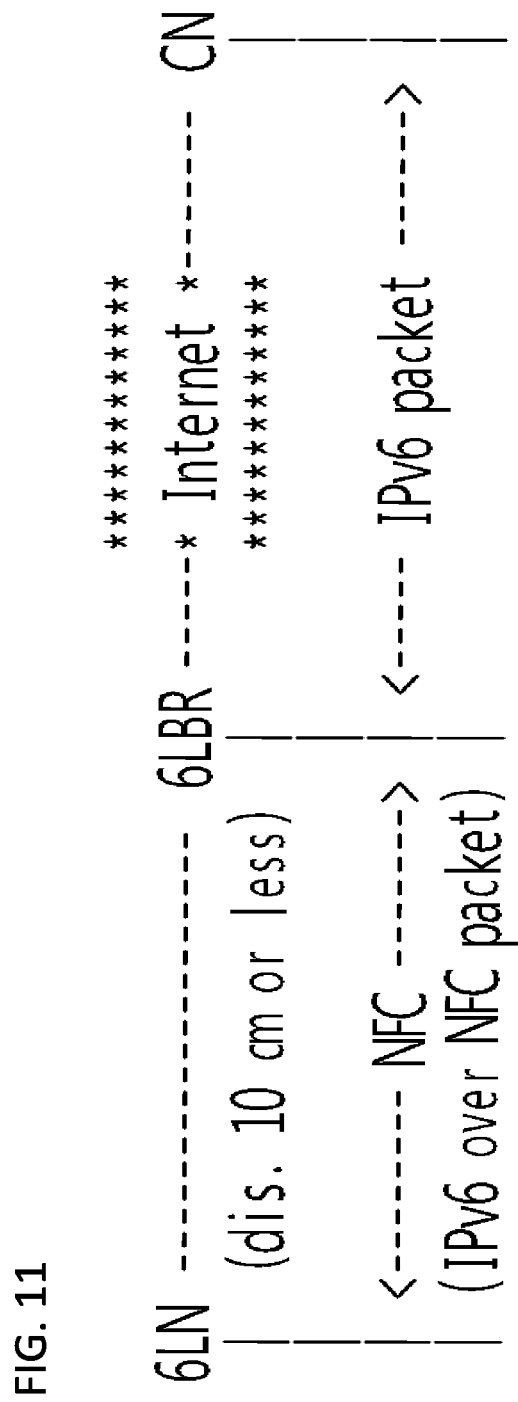
FIG. 11 illustrates an example of an NFC-enabled device network connected to the Internet according to an embodiment.

FIG. 11 illustrates an example of an NFC-enabled device network connected to the Internet according to an embodiment.

Referring to FIG. 11, due to communication characteristics, NFC-enabled devices are to be in maximal contact. This aspect may cause inconvenience, however, may act as being advantageous in terms of security. For example, to steal data, a hacker is to approach within 10 cm between two NFC-enabled devices. Accordingly, when the security against the approach of the hacker is visibly guaranteed, data may be safely transmitted. Based on characteristics of data, communication requiring fastness of big data may utilize wireless fidelity (Wi-Fi) or Bluetooth, and data requiring maximum security may be safely transmitted against a hacker with only a single touch over NFC.

Since an RF distance between 6NL and 6NBR is to be within 10 cm, one of key applications may most securely transmit IPv6 packets using adaptation technology for IPv6 over NFC. If any third party is to hack into the RF distance between 6NL and 6NBR, the third party is to nearly touch the 6NL and 6NBR. Applications may select types of air interfaces, for example, BT-LE, Wi-Fi, and NFC, to transmit data based on characteristics of data. NFC may be the best solution for secured and private information. The distance between 6LN and 6LBR is to be 10 cm or less. If any laptop computer is close to a user, the laptop computer becomes 6LBR. Additionally, when the user mounts an NFC-enabled air interface adaptor, for example, a portable small NFC dongle, on the laptop computer, the NFC-enabled device (6LN) of the user may communicate with the laptop computer (6LBR) within the distance of 10 cm.

Figure 12:
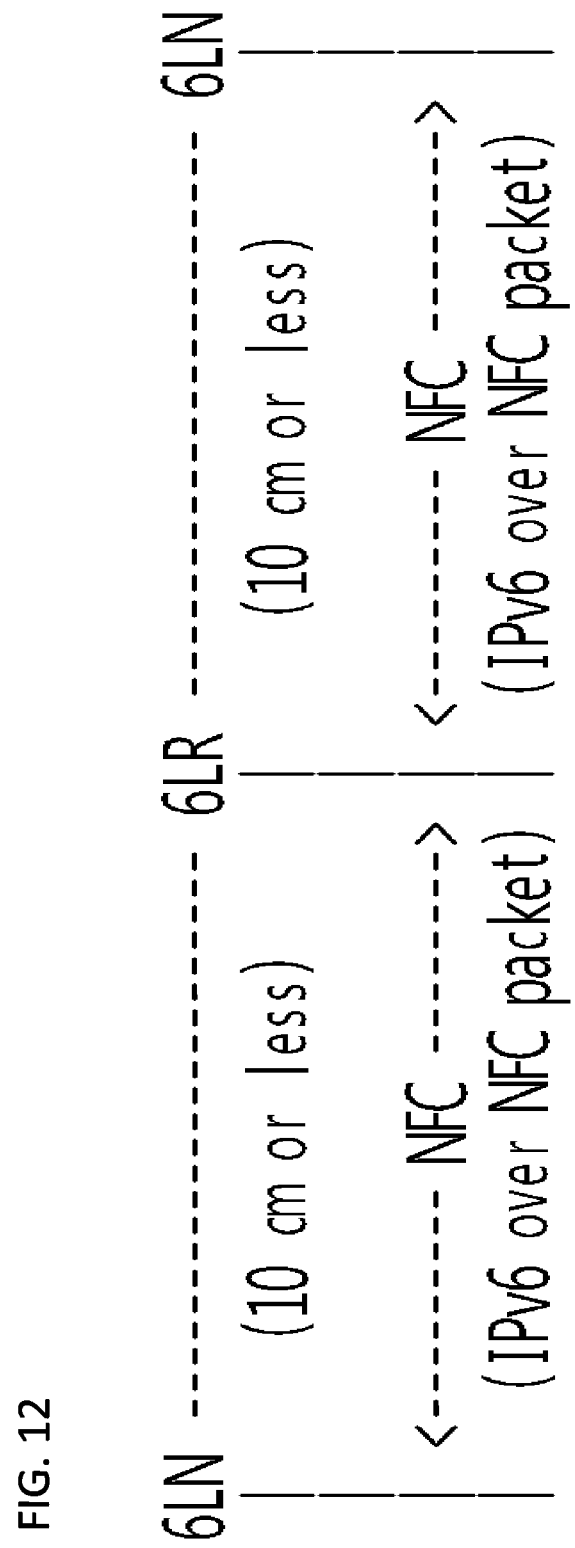
FIG. 12 illustrates an example of an NFC-enabled device network isolated from the Internet according to an embodiment.

FIG. 12 illustrates an example of an NFC-enabled device network isolated from the Internet according to an embodiment.

Referring to FIG. 12, in some scenarios, the NFC-enabled device network may transiently be a simple isolated network.

Also, a network configuration for ad-hoc networking between NFC devices is illustrated in FIG. 12.

In mobile phone markets, applications are designed and made by users and developers. The users and the developers may conceive interesting applications that enable three or more mobile phones to touch or attach one another in order to accomplish the outstanding performance.

In the network configuration of FIG. 12, a user-oriented market is currently activated using a mobile phone. Accordingly, when an interesting application is designed on a user side, a service providing a further enhanced performance may be provided based on the aspect that NFC devices are to be within a close distance. For example, three or four mobile phones may be connected to make an extended banner in a concert hall so that a long sentence may be easily recognized at a remote distance. In addition, if three or more mobile phones may play multichannel sound of music together such as a group play, a further excellent play may be provided.

Figure 13:
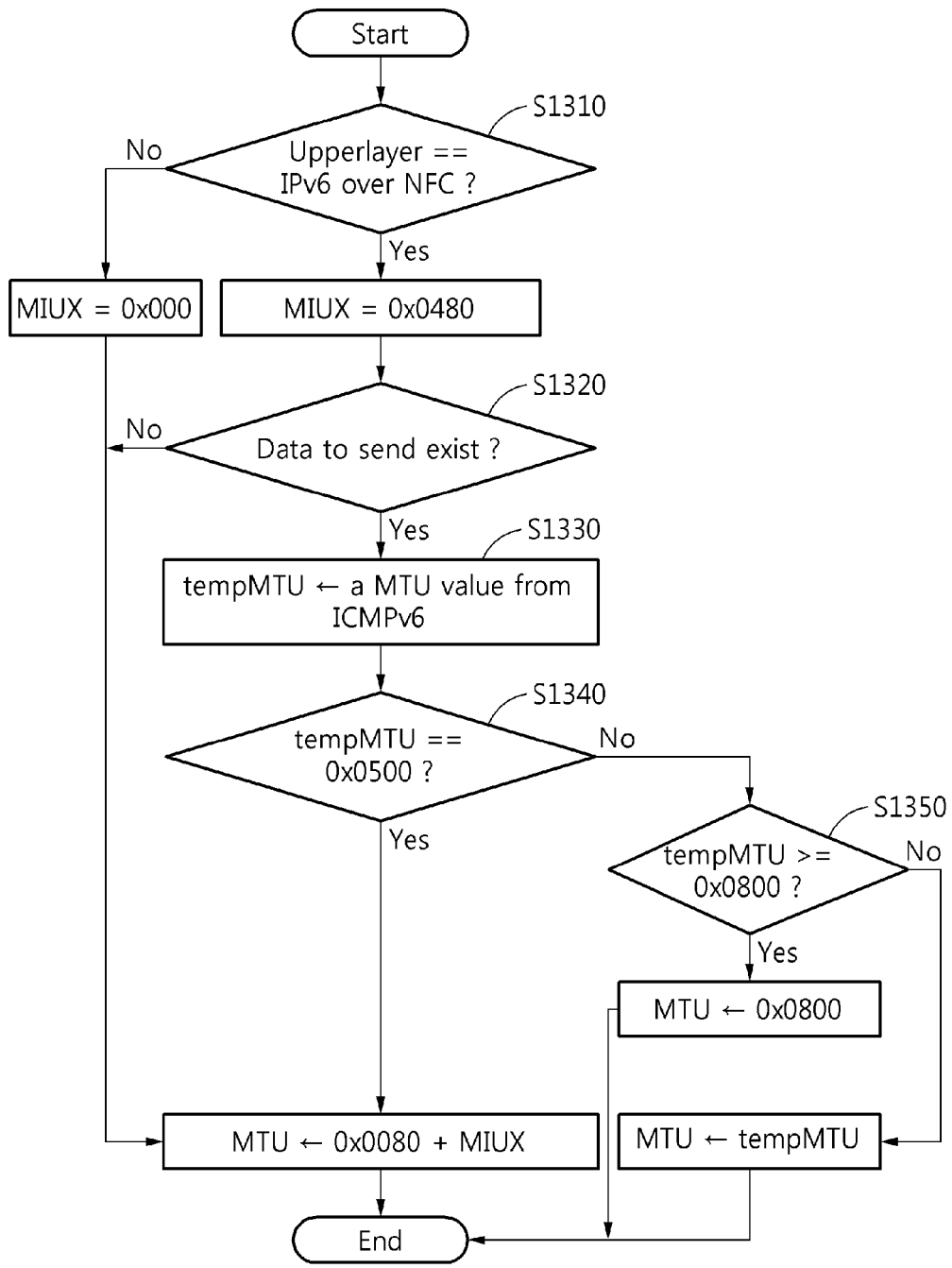
FIG. 13 is a flowchart illustrating a method of determining a Maximum Transfer Unit (MTU) according to an embodiment.

FIG. 13 is a flowchart illustrating a method of determining an MTU according to an embodiment.

Referring to FIG. 13, an NFC-enabled device may variably determine an MTU value prior to communicating with other neighbor terminals, for example, other NFC-enabled devices. Accordingly, since a size of an MTU may be changed to be suitable for a link characteristic based on a circumstance, a method of transmitting IPv6 packets over NFC may enhance the transmission efficiency or performance.

The NFC-enabled device may variably determine the MTU before connecting to another NFC-enabled device.

In operation S1310, the NFC-enabled device may verify whether an adaptation layer for IPv6 over NFC is present in an upper layer. For example, when the adaptation layer is present in the upper layer, the NFC-enabled device may basically determine an MIUX value as 0x480 (1152 bytes). This is to fit the MTU value into 1280 bytes that is a basic MTU value since the NFC-enabled device is to transmit an IPv6 packet. Conversely, when the adaptation layer is absent in the upper layer, the NFC-enabled device may basically determine the MIUX value as 0x00 (0 byte).

When an IPv6 packet having data to send is present in operation S1320, the NFC-enabled device may discover an MTU value from a neighbor terminal in operation S1330. For example, the NFC-enabled device may discover the MTU value from a neighbor terminal of ICMPv6 prior to transmitting data.

In operation S1340, the NFC-enabled device may compare the discovered MTU value, for example, tempMTU, to a first setting value, for example, 0x0500 (1280 bytes) based on the discovered MTU value, for example, tempMTU. For example, when the discovered MTU value, for example, tempMTU, is equal to the first setting value, the NFC-enabled device may determine the MIUX value as the first setting value. For example, the first setting value may be 0x0500 (1280 bytes).

In operation S1350, the NFC-enabled device may compare the discovered MTU value to a second setting value based on a comparison result with the first setting value. That is, when the discovered MTU value, for example, tempMTU, differs from the first setting value, the NFC-enabled device may compare the discovered MTU value to the second setting value. For example, when the discovered MTU value, for example, tempMTU, is greater than or equal to the second setting value, the NFC-enabled device may determine the MTU value as the second setting value. For example, the second setting value may be 0x0880 (2176 bytes) that is a variable maximum MTU size. Conversely, when the discovered MTU value, for example, tempMTU, is less than the second setting value, the NFC-enabled device may determine the MTU value as the discovered MTU value, for example, tempMTU.

The IEEE 802.15.4 based IPv6 transmission methods according to embodiments may be applicable based on characteristics of NFC and thus, may provide a service with high performance and high efficiency in terms of security or user markets. Accordingly, the methods may contribute to making a higher value-added business.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

The above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, the present disclosure is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of transmitting an Internet Protocol version 6 (IPv6) packet over near field communication (NFC), the method comprising:
   receiving, by an NFC-enabled device, the IPv6 packet through a Logical Link Control Protocol (LLCP), and transmitting the IPv6 packet to an Information Field in Protocol Data Unit (I PDU) of the LLCP, wherein the maximum number of octets in the I PDU is determined based on a Maximum Transfer Unit (MTU);
   transmitting, by the NFC-enabled device, the IPv6 packet through an adaptation layer for IPv6 over NFC;
   determining that a size of the MTU is 128 octets if a Maximum Information Unit extension (MIUX) parameter is not transmitted; and
   determining the size of the MTU based on the MIUX parameter included in the I PDU if the MIUX parameter is transmitted,
   wherein when the MIUX parameter is encoded as a TLV (Type-Length-Value), the MIUX parameter is encoded into the least significant 11 bits of a TLV Value field.

2. The method of claim 1, further comprising:
   generating an interface identifier (IID) included in an IPv6 link local address of an NFC-enabled communication device based on an address of the LLCP.

3. The method of claim 2, wherein the address of the LLCP comprises at least one of an address of a Destination Service Access Point (DSAP) and an address of a Source Service Access Point (SSAP).

4. The method of claim 1, wherein the determining comprises verifying a presence of the adaptation layer and determining the MIUX parameter based on a result of verifying.

5. The method of claim 1, wherein, in response to a presence of the adaptation layer and a presence of the IPv6 packet to be transmitted, the determining comprises:
   discovering an MTU value from a neighbor communication device of a communication device to transmit the IPv6 packet; and
   determining the MTU based on the discovered MTU value.

6. The method of claim 5, wherein the determining of the MTU based on the discovered MTU value comprises determining the MTU by comparing the discovered MTU value and a first setting value.

7. The method of claim 6, wherein, in response to the discovered MTU value differing from the first setting value, the determining of the MTU based on the discovered MTU value further comprises determining the MTU by comparing the discovered MTU value and a second setting value.

8. The method of claim 7, wherein the second setting value is 2176 bytes.

9. The method of claim 6, wherein the first setting value is 1280 bytes.

10. The method of claim 5, wherein the neighbor communication device is a neighbor terminal of Internet Control Message Protocol version 6 (ICMPv6).

11. A near-field communication (NFC)-enabled communication device, the communication device comprising a processor implementing:
    a Logical Link Control Protocol (LLCP) configured to receive an Internet Protocol version 6 (IPv6) packet, and to transmit the IPv6 packet to an Information Field in Protocol Data Unit (I PDU); and
    an adaptation layer for IPv6 over NFC configured to transmit and receive the IPv6 packet,
    wherein the maximum number of octets in the I PDU is determined based on a Maximum Transfer Unit (MTU),
    wherein the communication device is further configured to determine that a size of the MTU is 128 octets if a Maximum Information Unit extension (MIUX) parameter is not transmitted, the communication device is further configured to determine the MTU based on a Maximum Information Unit extension (MIUX) parameter included in the I PDU if the MIUX parameter is transmitted, and wherein when the MIUX parameter is encoded as a TLV (Type-Length-Value), the MIUX parameter is encoded into the least significant 11 bits of a TLV Value field.

12. The communication device of claim 11, wherein the communication device is configured to generate an interface identifier (IID) included in an IPv6 link local address of the NFC-enabled communication device based on an address of the LLCP.

13. The communication device of claim 12, wherein the address of the LLCP comprises at least one of an address of a Destination Service Access Point (DSAP) and an address of a Source Service Access Point (SSAP).

14. The communication device of claim 11, wherein the communication device is further configured to verify a presence of the adaptation layer and to determine the MIUX parameter based on a result of verifying.

15. The communication device of claim 11, wherein, in response to a presence of the adaptation layer and a presence of the IPv6 packet to be transmitted, the communication device is further configured to discover an MTU value from a neighbor communication device of the communication device to transmit the IPv6 packet, and to determine the MTU based on the discovered MTU value.

16. The communication device of claim 15, wherein the communication device is further configured to determine the MTU by comparing the discovered MTU value and a first setting value.

17. The communication device of claim 16, wherein, in response to the discovered MTU value differing from the first setting value, the communication device is further configured to determine the MTU by comparing the discovered MTU value and a second setting value.

* * * * *